US011259458B2

(12) United States Patent
Hu et al.

(10) Patent No.: US 11,259,458 B2
(45) Date of Patent: Mar. 1, 2022

(54) AUTOMATIC PICKING AND CASTING DEVICE FOR TRANSPLANTING MACHINE AND ITS METHOD

(71) Applicant: JIANGSU UNIVERSITY, Jiangsu (CN)

(72) Inventors: Jianping Hu, Jiangsu (CN); Jie Pan, Jiangsu (CN); Weizheng Fei, Jiangsu (CN); Lvhua Han, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 327 days.

(21) Appl. No.: 16/477,805

(22) PCT Filed: Mar. 14, 2018

(86) PCT No.: PCT/CN2018/078897
§ 371 (c)(1),
(2) Date: Jul. 12, 2019

(87) PCT Pub. No.: WO2019/148597
PCT Pub. Date: Aug. 8, 2019

(65) Prior Publication Data
US 2021/0329830 A1    Oct. 28, 2021

(30) Foreign Application Priority Data

Feb. 2, 2018    (CN) .......................... 201810105734.4

(51) Int. Cl.
*A01C 11/02*    (2006.01)
(52) U.S. Cl.
CPC .................................. *A01C 11/025* (2013.01)

(58) Field of Classification Search
CPC ....... A01C 11/025; A01C 11/04; A01C 11/00; A01C 11/006; A01C 11/02
See application file for complete search history.

(56) References Cited

U.S. PATENT DOCUMENTS 5,676,072 A * 10/1997 Williames ............ A01C 11/025
                                                      111/105
5,911,631 A   6/1999 Bouldin et al.
(Continued)

FOREIGN PATENT DOCUMENTS

| CN | 201491493 U | 6/2010 |
| CN | 202818947 U | 3/2013 |

(Continued)

*Primary Examiner* — Jamie L McGowan
(74) *Attorney, Agent, or Firm* — Saliwanchik, Lloyd & Eisenschenk (57) ABSTRACT

An automatic picking and launching seedling device for a transplanting machine is provided, as well as methods of using the same. The device includes a seedling picking mechanism, seedling guiding devices, a box shifting mechanism and seedling separating mechanisms. The seedling picking mechanism is mounted on the box shifting mechanism, the two sets of seedling separating mechanisms are symmetrically arranged on both sides of the box shifting mechanism, and the seedling guiding device is arranged on the top of the seedling separating mechanism. The box shifting mechanism transports the disc to the seedling picking point, and the seedling picking mechanism moves the picking seedling claws to the seedling picking point to take the seedlings and moves to the seedling launching point to launch the seedlings.

9 Claims, 9 Drawing Sheets

(56) References Cited

U.S. PATENT DOCUMENTS

| | | | | |
|---|---|---|---|---|
| 6,634,306 | B1* | 10/2003 | Faulring | A01C 11/025 111/105 |
| 7,036,440 | B1* | 5/2006 | Sena | A01C 11/025 111/105 |
| 7,051,475 | B1* | 5/2006 | Sena | A01C 11/025 111/105 |
| 2002/0043195 | A1* | 4/2002 | Williames | A01C 11/025 111/105 |
| 2006/0130720 | A1* | 6/2006 | Parrein | A01C 11/025 111/105 |
| 2012/0174839 | A1* | 7/2012 | Faulring | A01G 9/0299 111/100 |
| 2015/0342112 | A1* | 12/2015 | Buell | A01C 11/02 111/105 |
| 2017/0265378 | A1 | 9/2017 | Aikala | |
| 2020/0260636 | A1* | 8/2020 | Ito | A01C 11/025 |

FOREIGN PATENT DOCUMENTS

| | | |
|---|---|---|
| CN | 203289877 U | 11/2013 |
| CN | 105103741 A | 12/2015 |
| CN | 106258124 A | 1/2017 |
| CN | 106358537 A | 2/2017 |
| CN | 106538122 A | 3/2017 |
| CN | 206629432 U | 11/2017 |

\* cited by examiner

AUTOMATIC PICKING AND CASTING DEVICE FOR TRANSPLANTING MACHINE AND ITS METHOD

CROSS REFERENCE TO RELATED APPLICATIONS

This application is a National Stage Application of International Application Number PCT/CN2018/078897, filed Mar. 14, 2018; which claims priority to Chinese Application No. 201810105734.4, filed Feb. 2, 2018.

TECHNICAL FIELD

The present invention relates to the field of agricultural machinery, in particular to an automatic picking and launching seedling device for transplanting machine and method thereof.

BACKGROUND TECHNIQUE

Vegetables are an indispensable food in life. Chinese planting area has reached 300 million mu, with annual output exceeding 700 million tons, and continues to grow. China is the largest vegetable producer and consumer in the world. At present, the cultivation of agricultural vegetables in China mostly adopts the method of planting seedlings on disc at first and then transplanting, which can make vegetables avoid natural disasters such as drought and freezing damage during growing seedling period. It also can make full use of light and heat resources, and has the effects of climate compensation and increasing maturity and yield of crops, which has enormous economic and social benefits. Therefore, the development of a fully automatic vegetable transplanting machine which is suitable for Chinese national conditions has become a prerequisite for large-scale planting of vegetables.

At present, the transplanting machines on the market are semi-automatic and fully automatic. The semi-automatic transplanting machine needs to manually pick seedlings from the disc and launch seedlings. This transplanting machine has high labor intensity and low efficiency. The fully automatic transplanting machine integrates advanced integrated technology of machine, electricity, liquid and gas, which can realize automatic vegetable transplanting in the whole process of picking seedling, launching seedling, planting seedling and covering soil, with low labor intensity and high efficiency. The seedling picking mechanism is the core part of the fully automatic transplanting machine and is the symbol for distinguishing the fully automatic and the semi-automatic transplanting machine. The efficiency and the quality of the seedling picking mechanism directly determine the overall operation of the fully automatic transplanting machine. In the existing technology, Chinese patent with publication 106258124A discloses a method and system of picking seedlings in rows at intervals and dropping seedlings sequentially by a pot seedling transplanter. The system adopt a swinging seedling picking mechanism, which takes seedlings at intervals and six seedlings once, so as to realize uninterrupted supply of disk and picking seedling. However, it is necessary to take a row of seedlings in twice, which is inefficient, and driven by one side of the cylinder, which has poor stability. After the disc is in place, the seedling claw is inserted from the top of the seedling pot, and the leaves and stems of the seedlings are greatly damaged. The seedlings are launched in sequence, and only a set of the seedling separating mechanism receives the seedlings during moving. When the speed is fast, it is easy to have problems such as hanging seedlings and poor posture of seedlings.

Content of Invention

In view of the disadvantage in the existing technology, the present invention provides an automatic picking and launching seedling device for transplanting machine and method thereof, which can realize picking seedlings without interval and launching seedlings at the same time and overcome the problems of being difficult to control the time of launching seedlings and low success rate due to picking seedlings at intervals and launching seedlings in sequence. The disc only needs to be transported vertically, which improves the efficiency of the transporting disc, picking seedlings and launching seedlings. By changing the number of seedling claws, it can be adapted to different discs with 72 holes, 128 holes, etc. The seedling claws first reach the picking point, and then the whole row of seedlings to be taken by the disc is transferred to the bottom of the seedling claws to pick seedlings, so that needles of the seedling claws are used to comb the seedlings in a pot before inserting into the pot, to separate the leaves of adjacent seedlings in the pot which are staggered together, overcome the phenomenon of clamping and damaging seedlings since the existing picking claws are directly inserted into the pots from the top of the seedlings, reduce the damage of the seedlings and improve the quality of picking seedlings. The guiding device receives the seedlings statically and shortens the free-falling movement distance, so that the launching of seedlings is more accurate.

The present invention achieves the above technical objects by the following technical means.

An automatic picking and launching seedling device for transplanting machine, characterized in that, includes a seedling picking mechanism, seedling guiding devices, a box shifting mechanism, and a seedling separating mechanisms. The seedling picking mechanism is mounted on the box shifting mechanism, the two sets of seedling separating mechanisms are symmetrically arranged on both sides of the box shifting mechanism, and the seedling guiding device is arranged on the top of the seedling separating mechanism.

The seedling picking mechanism includes a vertical moving linear guide, a rectangular frame, a spring, a vertical moving cylinder, a picking seedling claw, a bottom plate, a horizontal moving linear guide, and a horizontal moving cylinder. The rectangular frame is fixed on a bracket, the left and right sides of the rectangular frame are mounted with the vertical moving linear guide which is matched with several first sliders mounted on the bottom plate. The vertical moving cylinder is mounted on the upper surface of the rectangular frame, and the piston rod of the vertical moving cylinder is connected to the bottom plate. The bottom plate is provided with at least two parallel horizontal moving linear guides on the front surface, and several second sliders are mounted thereon. Two horizontal moving cylinders are mounted on the back surface of the bottom plate, the bottom plate is provided with several parallel-arranged grooves, through which the piston rods of horizontal moving cylinders are connected to moving driving boards for the picking seedling claws on the front surface of the bottom plate. The moving driving boards for picking seedling claws are driven to slide in the grooves by horizontal moving cylinders. And two moving driving boards for picking seedling claws are alternately mounted on the second slide on both ends of the horizontal moving linear guide. Several moving connecting plates for the picking seedling claws are mounted on the other second sliders through the rail slider connecting blocks, and the several picking seedlings claws are respectively mounted on the moving connecting plates for the picking seedling claws. The two moving driving boards for picking seedling claws are respectively connected with the outermost two rail slider connecting blocks. The springs are arranged between the adjacent two picking seedlings claws and are mounted on the screws, and the ends of the screws are arranged with a limit nut. When the horizontal moving cylinder is fully contracted, the innermost picking seedling claw is concentric with the innermost hole of the disc, the outermost picking seedling claw is concentric with the outermost hole of the disc, and all the picking seedling claws are concentric with the holes in the same row on the disc. When the horizontal moving cylinders is fully extended, the compression amount of the spring is the minimum compression amount of the spring defined by the limit nut, the outermost picking seedling claw should be concentric with the upper opening of the outermost inclined seedling guiding barrels, and each picking seedling claw is concentric with each of the seedling guiding barrels.

The seedling guiding device mainly includes a mounting plate for seedling guiding barrel mounted on the bracket, a clasp for vertical seedling guiding barrel and a clasp for inclined seedling guiding barrel mounted on the mounting plate for seedling guiding barrel respectively, and a vertical seedling guiding barrels and an inclined seedling guiding barrels mounted on the clasp for vertical seedling guiding barrel and the clasp for inclined seedling guiding barrel respectively. The seedling guiding outlets of the vertical seedling guiding barrels and the inclined seedling guiding barrels are respectively concentric with the seedling separating cups which are arranged in a circular shape in the seedling separating mechanism.

Further, two oil pressure buffers are mounted on the back of the bottom plate through mounting bases for oil pressure buffer. The stop bolts are mounted at the center of the front position of the bottom plate through mounting bases for the stop bolt. When the horizontal moving cylinder is fully contracted, the innermost picking seedling claws should be contacted with stop bolts for limiting position. The length of the stop bolts should meet that the innermost picking seedling claw is concentric with the innermost hole of the disc, and the outermost picking seedling claw is concentric with the outermost hole of the disc. When the horizontal moving cylinders is extended to the farthest end and contacted with the oil pressure buffer for limiting position, the outermost picking seedling claw should be concentric with the upper opening of the outermost inclined seedling guiding barrels.

Further, the number of horizontal moving linear guides is four and arranged in parallel, and two driving boards for picking seedling claws are alternately mounted on the second sliders at both ends of the horizontal moving linear guides.

Further, picking seedling claws are provided with spacers for picking seedling claw. When the horizontal moving cylinder is fully contracted, the distance between adjacent picking seedling claws is the same as the distance between the adjacent holes of the disc.

Further, spring plates are respectively disposed at both ends of the springs, and the spring plates are also mounted on the screw.

Further, the piston rod of the vertical moving cylinder is connected to the bottom plate by a fisheye joint and a connecting plate for the vertical moving cylinder. The piston rod of horizontal moving cylinders is connected to the bottom plate by a fisheye joint and a footstand for horizontal moving cylinder.

Further, the number of the inclined seedling guiding barrels is one, and the inclined seedling guiding barrel is located at the innermost side of the seedling guiding device.

Further, the bracket includes a vertical bracket, a cross bracket, the vertical bracket is mounted on the side of the seedling separating mechanism, and the cross bracket is mounted on the top of the vertical bracket. The mounting plate for seedling guiding barrel is mounted on the cross bracket.

A picking and launching seedling method for the automatic picking and launching seedling device for a transplanting machine, characterized in that, includes the following steps:

S1: the disc is placed on the box shifting mechanism, and the horizontal moving cylinder is extended to the farthest end at the same time. Each picking seedling claw is located above the vertical seedling guiding barrel and the inclined seedling guiding barrel.

S2: the horizontal moving cylinder is contracted, and the picking seedling claws are driven to the center on the horizontal moving linear guide by the moving driving board for picking seedling claws. When the innermost picking seedling claw is contracted with the stop bolts, the horizontal moving cylinders continue to contract and compress the springs until the spacer for picking seedling claw is against the picking seedling claw. At the same time, each of the picking seedling claws is located above the disc, the distance between them is the same as the distance between the holes of the disc, and the picking seedling claws are located at picking seedling point.

S3: the box shifting mechanism transports the disc to the seedling picking point.

S4: the vertical moving cylinder is extended, and the picking seedling claws are moved downward on the vertical moving linear guide through the driving of bottom plate. The picking seedling claws are inserted downward into the seedling pot and clamp the seedling pot at the same time.

S5: the vertical moving cylinder is contracted so that the picking seedling claws are move upward on the vertical moving linear guide, to pull out the seedlings pot upward by the picking seedling claws and make the bottom of the seedling pot higher than the upper surface of the disc.

S6: the horizontal moving cylinder is extended, and the picking seedling claws are driven to the two sides on the horizontal moving linear guide through the moving driving board for picking seedling claws. The spring is gradually opened and pushes the spring plate to the limit nut, so that the distance between each picking seedling claw is spread to the same distance as the axis of each seedling guiding barrel. When the horizontal moving cylinder is extended and contacted with the oil pressure buffer, each of the picking seedling claws corresponds to each of the seedling guiding barrels and reaches the launching seedling point.

S7: the picking seedling claws are opened and launch the seedling pot into the seedling guiding device. The seedling pot enters the seedling separating mechanism along the seedling guiding barrels, and the seedling separating mechanism rotates the seedling pot to the seedling falling point.

S8: the horizontal moving cylinders is contracted again to move the picking seedling claw to the seedling picking point, the disc advances the distance of a hole, and start the next picking and launching cycle until the whole disc of seedling pots is taken.

The Beneficial Effects of the Invention

1. According to the present invention, the seedling picking mechanism can realize picking the whole row of seedlings without interval and launching seedlings at the same time, and overcome the problems of being difficult to control the time of launching seedlings and low success rate due to picking seedlings at intervals and launching seedlings in sequence. The disc only needs to be transported vertically, which improves the efficiency of the transporting disc, picking seedlings and launching seedlings.

2. According to the present invention, the seedling picking mechanism can adapt to different discs with 72 holes, 128 holes, etc. by changing the number of picking seedling claws, thickness of spacers for picking seedling claw.

3. According to the present invention, the picking seedling claws first reach seedling picking point and then the whole row of seedlings to be taken by the disc is transferred to the bottom of picking seedling claws to take the picking of seedlings, so that needles of the picking seedling claws pass through the middle of two seedlings, to separate leaves of adjacent seedlings in the pot which are staggered together, and so that needles of the seedling claws are used to comb the seedlings before inserting into the pot. It overcomes the phenomenon of clamping and damaging seedlings that the existing picking seedling claws are inserted directly into the seedling pots from the top of the seedlings which clip and hurt seedlings, reduces the damage of the seedlings and improves the quality of picking.

4. According to the present invention, the seedling guiding device receives the seedlings statically and shortens the free-falling movement distance, so that the launching of seedlings is more accurate.

DESCRIPTION OF THE FIGURES

FIGS. 9 (*a*) and (*b*) are views showing the state at the seedling picking point and seedling launching point.

FIGS. 11 (*a*), (*b*), (*c*), (*d*), (*e*), (*f*), (*g*) are views respectively showing the mechanism views which represent the initial state of picking the whole row of seedling and launching seedling device at the same time, the picking seedling claws reaching the seedling picking point, the box shifting mechanism transporting the disc to the seedling picking point, the picking seedling claws inserting into the seedling pot, the picking seedling claws pulling out of the seedling pot, picking seedling claws moving the seedlings to the seedling launching point, picking seedling claws launching the seedling into the seedling guiding device.

Wherein:

1 seedling picking mechanism, 1-1 vertical moving linear guide, 1-2 rectangular frame, 1-3 spring, 1-4 rail slider connecting block, 1-5 spacers for picking seedling claws, 1-6 spring plate, 1-7 stop bolt, 1-8 mounting base for the stop bolt, 1-9 vertical moving cylinder, 1-10 fisheye joint for vertical moving cylinder, 1-11 picking seedling claws, 1-12 bottom plate, 1-13 horizontal moving linear guide, 1-14 moving connecting plate for picking seedling claws, 1-15 screw, 1-16 limit nut 1-17 moving driving board for picking seedling claws, 1-18 oil pressure buffers, 1-19 mounting base for oil pressure buffer, 1-20 connecting plate for horizontal moving cylinder, 1-21 mounting plate for vertical moving cylinder, 1-22 connecting plate for vertical moving cylinder, 1-23 disc, 1-24 fisheye joint for horizontal moving cylinder, 1-25 footstand for horizontal moving cylinders, 1-26 horizontal moving cylinder, 2 seedling guiding device, 2-1 mounting plate for seedling guiding barrel, 2-2 vertical bracket, 2-3 clasp for vertical seedling guiding barrel, 2-4 vertical seedling guiding barrels, 2-5 inclined seedling guiding barrels, 2-6 clasp for inclined seedling guiding barrel, 2-7 cross bracket, 3 box shifting mechanism, 4 seedling separating mechanism, 4-1 seedling separating cups, 5 chassis of transplanting machine.

EMBODIMENTS

The present invention will be further described below in conjunction with the figures and embodiments, but the protection scope of the present invention is not limited to this.

Figure 1:
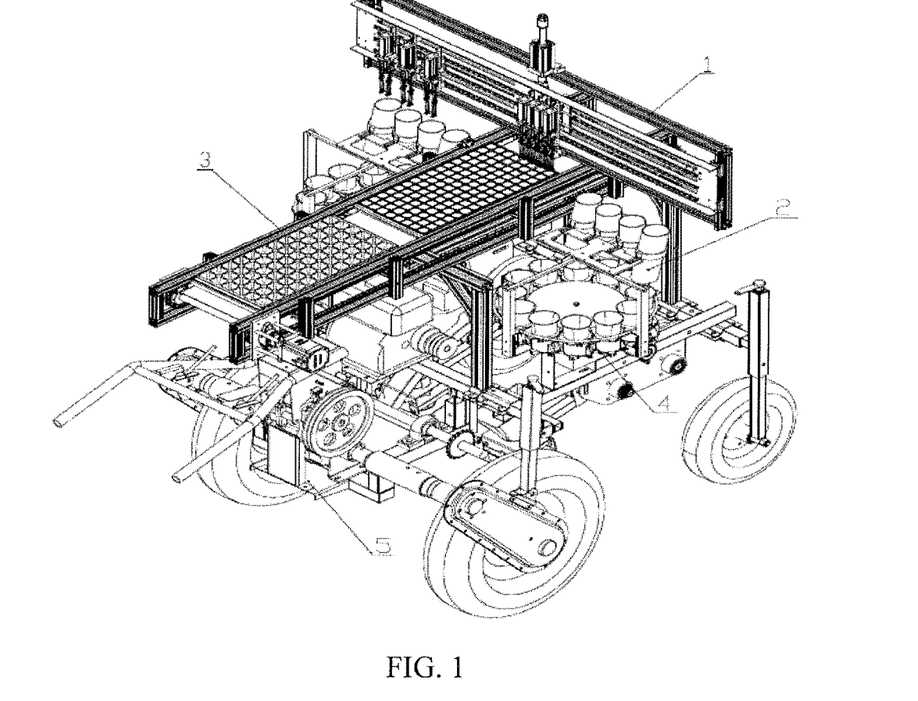
FIG. 1 is a view showing the installation of the automatic picking and launching seedling device on the chassis of the transplanting machine.
Figure 2:
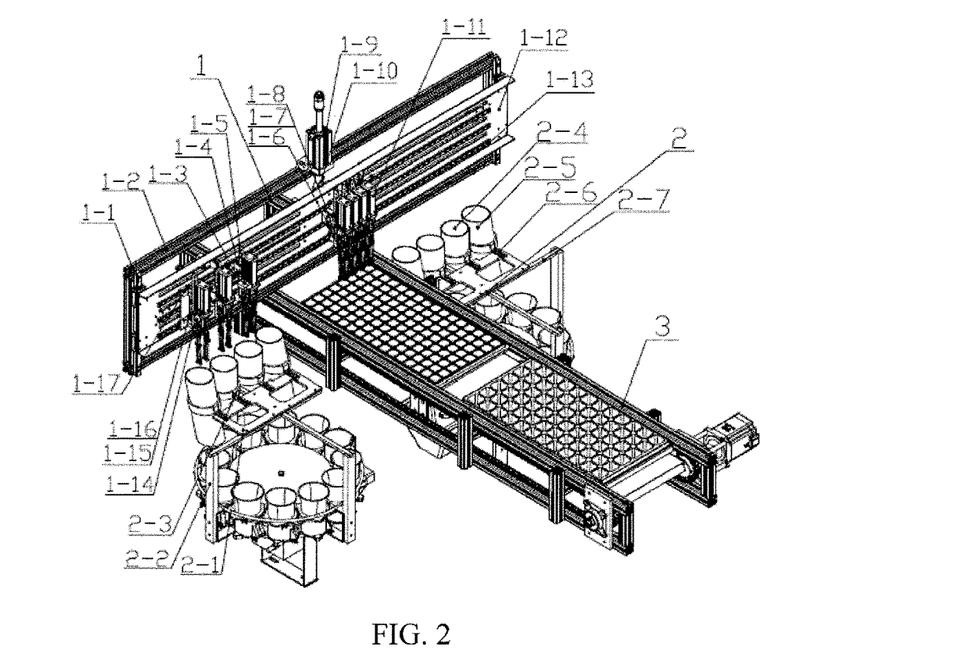
FIG. 2 is the schematic view 1 of the automatic picking and launching seedling device.
Figure 3:
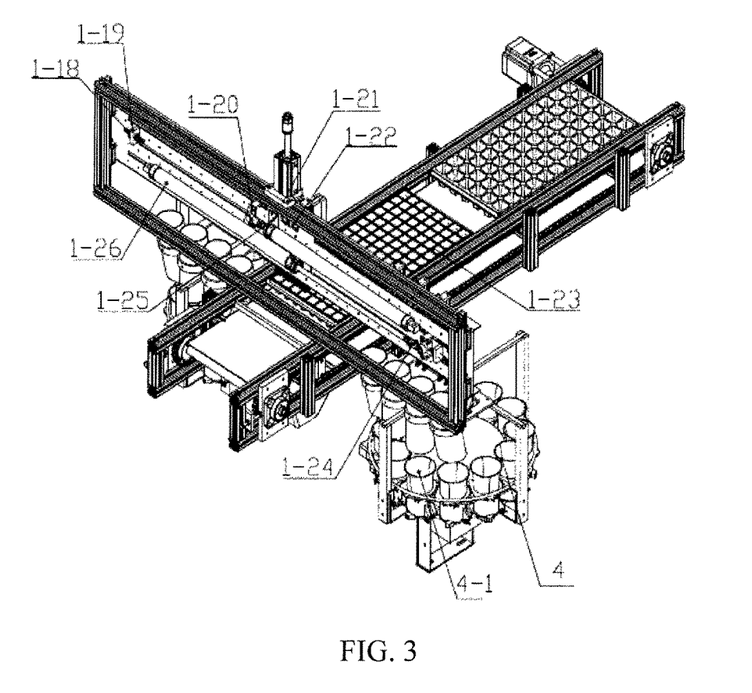
FIG. 3 is the schematic view 2 of the automatic picking and launching seedling device.

As shown in FIGS. 1, 2 and 3, the automatic picking and launching seedling device for transplanting machine described in the present invention includes a seedling picking mechanism 1, seedling guiding devices 2, a box shifting mechanism 3, and seedling separating mechanisms 4. The seedling picking mechanism 1 is installed on the box shifting mechanism 3, the two sets of seedling separating mechanisms 4 are symmetrically arranged on both sides of the box shifting mechanism 3, and the seedling guiding device 2 is arranged on the top of the seedling separating mechanism 4. The entire automatic picking and launching seedling device can be mounted on the chassis 5 of transplanting machine.

Figure 4:
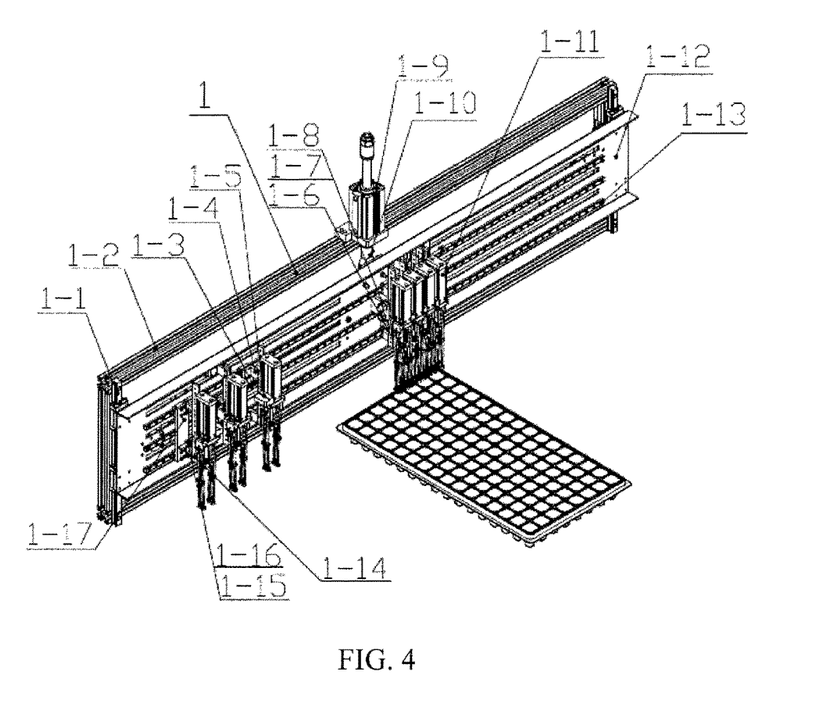
FIG. 4 is the schematic view 1 of the seedling picking mechanism.
Figure 5:
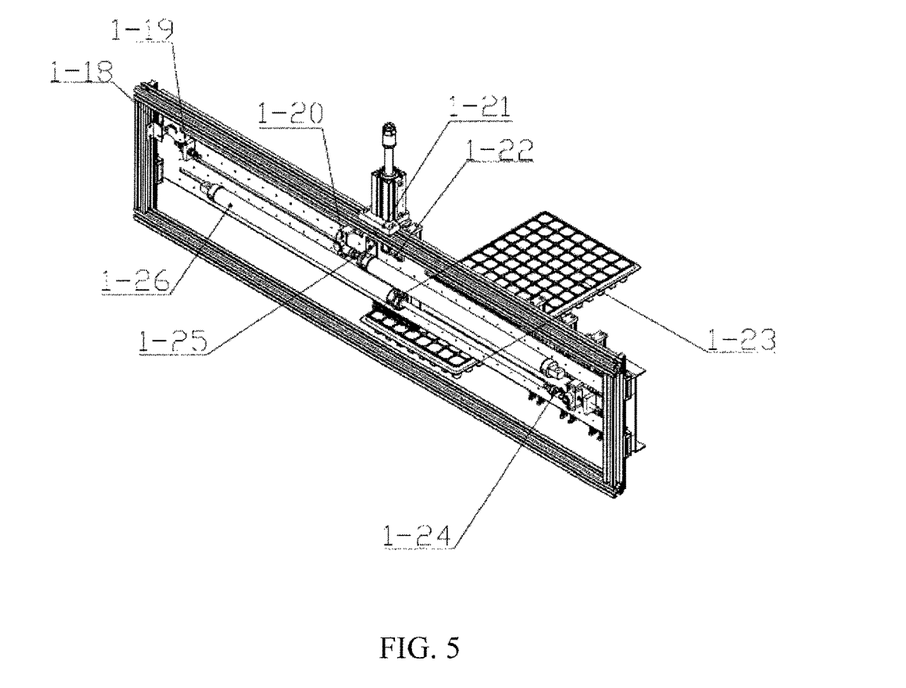
FIG. 5 is the schematic view 2 of the seedling picking mechanism.

As shown in FIGS. 4 and 5, the seedling picking mechanism 1 includes a vertical moving linear guide 1-1, a rectangular frame 1-2, a spring 1-3, a rail slider connecting block 1-4, a spacer for picking seedling claws 1-5, a spring plate 1-6, a stop bolt 1-7, a mounting base 1-8 for the stop bolt, a vertical moving cylinder 1-9, a fisheye joint 1-10 for vertical moving cylinder, a picking seedling claw 1-11, a bottom plate 1-12, a horizontal moving linear guide 1-13, a moving connecting plates 1-14 for picking seedling claws, a screw 1-15, a limit nut 1-16, a moving driving board 1-17 for picking seedling claws, an oil pressure buffer 1-18, a mounting base 1-19 for oil pressure buffer, a connecting plate 1-20 for horizontal moving cylinder, a mounting plate 1-21 for vertical moving cylinder, a connecting plate 1-22 for vertical moving cylinder, a disc 1-23, a fisheye joint 1-24 for horizontal moving cylinder, a footstand 1-25 for horizontal moving cylinder, a horizontal moving cylinders 1-26. The rectangular frame 1-2 is fixed on a bracket, the left and right sides of the rectangular frame 1-2 are mounted with the vertical moving linear guide 1-1. The bottom plate 1-12 is mounted on a first slider on the vertical moving linear guide 1-1. The vertical moving cylinder 1-9 are mounted on the middle position of upper surface of the rectangular frame 1-2 through the mounting plate 1-21 for vertical moving cylinder, the fisheye joint 1-10 for vertical moving cylinder is mounted on the piston rod of the vertical moving cylinder 1-9 and connected to the back surface of the bottom plate 1-12 through the connecting plate 1-22 for vertical moving cylinder.

Figure 6:
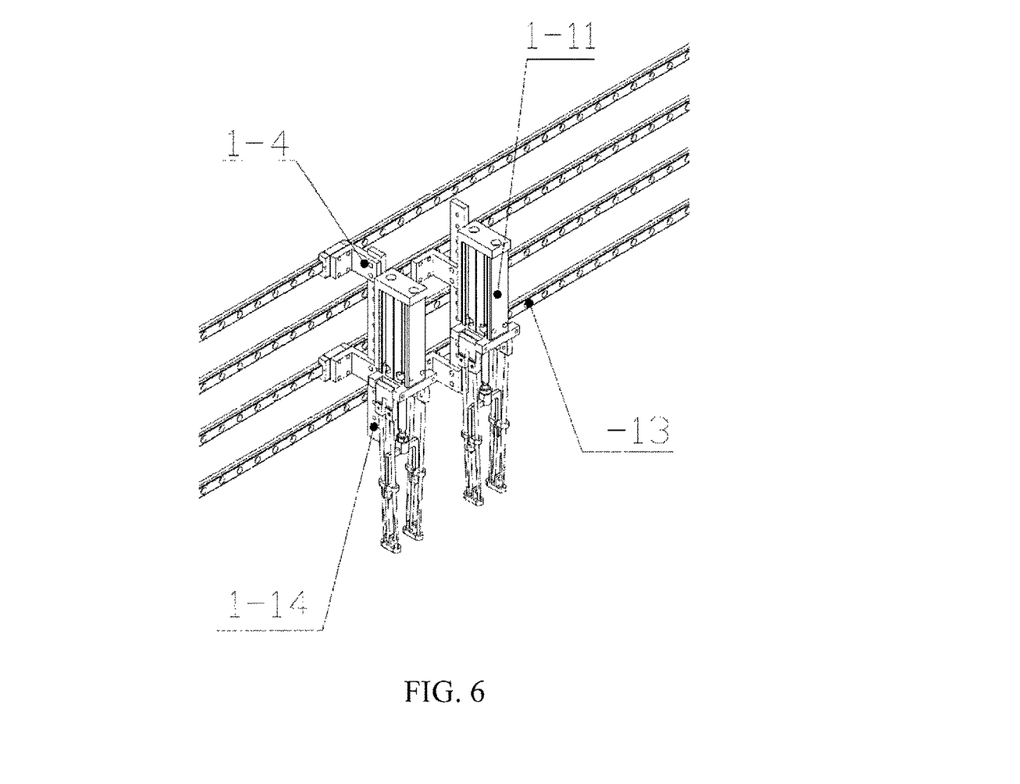
FIG. 6 is a schematic view showing the installation of the picking seedling claws on the horizontal moving linear guide.

Two horizontal moving cylinders 1-26 are mounted on the back surface of the bottom plate 1-12 through the footstand 1-25 for horizontal moving cylinder, the bottom plate 1-12 is provided with several parallel-arranged grooves and through which the piston rods of horizontal moving cylinders (1-26) are connected to the moving driving board 1-17 for picking seedling claws on the front surface of the bottom plate 1-12. The horizontal moving cylinders 1-26 drives the moving driving board 1-17 for picking seedling claws to move in grooves. Specifically, the fisheye joint 1-24 for horizontal moving cylinder are mounted on the piston rods of horizontal moving cylinders 1-26 and connected to the moving driving board 1-17 for picking seedling claws through the connecting plate 1-20 for horizontal moving cylinder. Two oil pressure buffers 1-18 are mounted on the back surface of the bottom plate 1-12 through the mounting base 1-19 for oil pressure buffer. Four horizontal moving linear guides 1-13 are mounted with a plurality of second sliders and in parallel on the front surface of the bottom plate 1-12. The stop bolts 1-7 are mounted at the front center position of the bottom plate 1-12 through the mounting base 1-8 for stop bolt. Two moving driving boards 1-17 for picking seedling claws are alternately mounted on the second slide on both ends of the horizontal moving linear guide 1-13. As shown in FIG. 6, several moving connecting plates 1-14 for picking seedling claws are mounted on the other second sliders of the horizontal moving linear guide 1-13 through the rail slider connecting blocks 1-4, and several picking seedlings claws 1-11 are respectively installed on the connecting plate 1-14 for picking seedling claws. Two moving driving boards 1-17 for picking seedling claws are respectively connected with the outermost two rail slider connecting blocks 1-4.

Figure 7:
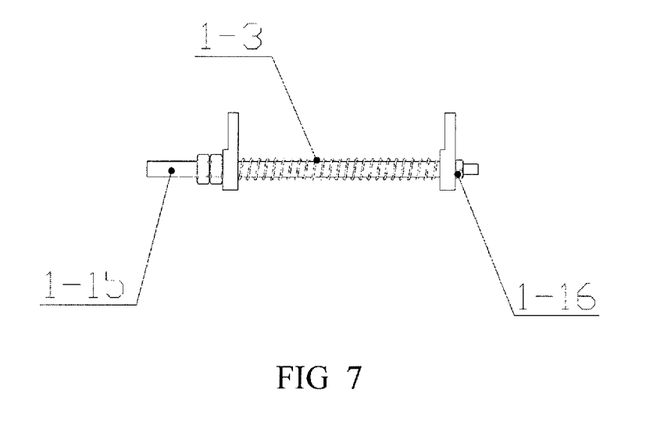
FIG. 7 is a schematic view showing the installation of the screw, the spring and the limit nut on the spring plate.

The springs 1-3 are arranged between the adjacent two picking seedlings claws 1-11, the springs 1-3 are mounted on the screws 1-15, and the both ends of the screws 1-15 are arranged with a limit nut 1-16. The spring plate 1-6 is provided with a hole whose diameter is larger than the diameter of the screw 1-15, so that the screw 1-15 can pass through, and is smaller than the outer diameter of the limit nuts 1-16. The spring plate 1-6 is mounted on the moving connecting plates 1-14 for picking seedling claws. As shown in FIG. 7, the limit nut 1-16 are respectively mounted on both ends of the screw 1-15 and respectively located outside the two spring plates 1-6.

When the horizontal moving cylinder 1-26 is fully contracted, the innermost picking seedling claw 1-11 is concentric with the innermost hole of the disc 1-23, the outermost picking seedling claw 1-11 is concentric with the outermost hole of the disc 1-23, and all the picking seedling claws 1-11 are concentric with the holes in the same row on the disc 1-23. When the horizontal moving cylinder 1-26 is fully extended, the compression amount of the spring 1-3 is the minimum compression amount of the spring 1-3 defined by the limit nut 1-16, the outermost picking seedling claw 1-11 should be concentric with the upper opening of the outermost inclined seedling guiding barrels 2-5, and each picking seedling claw 1-11 is concentric with each of the seedling guiding barrels 2-4, 2-5.

When the horizontal moving cylinders 1-26 is extended to the farthest end and contacted with the oil pressure buffer 1-18 for limiting position, the outermost picking seedling claw 1-11 should be concentric with the outermost inclined seedling guiding barrels 2-5, and at the same time, the picking seedling claws open and launch seedlings. When the horizontal moving cylinders 1-26 is fully contracted, the outermost picking seedling claws 1-11 is concentric with the outermost hole of the disc 1-23, the innermost picking seedling claws 1-11 should contact with the stop bolts 1-7 for limiting position. The length of the stop bolts 1-7 should meet that the innermost picking seedling claw 1-11 is concentric with the innermost hole of the disc 1-23.

Figure 8:
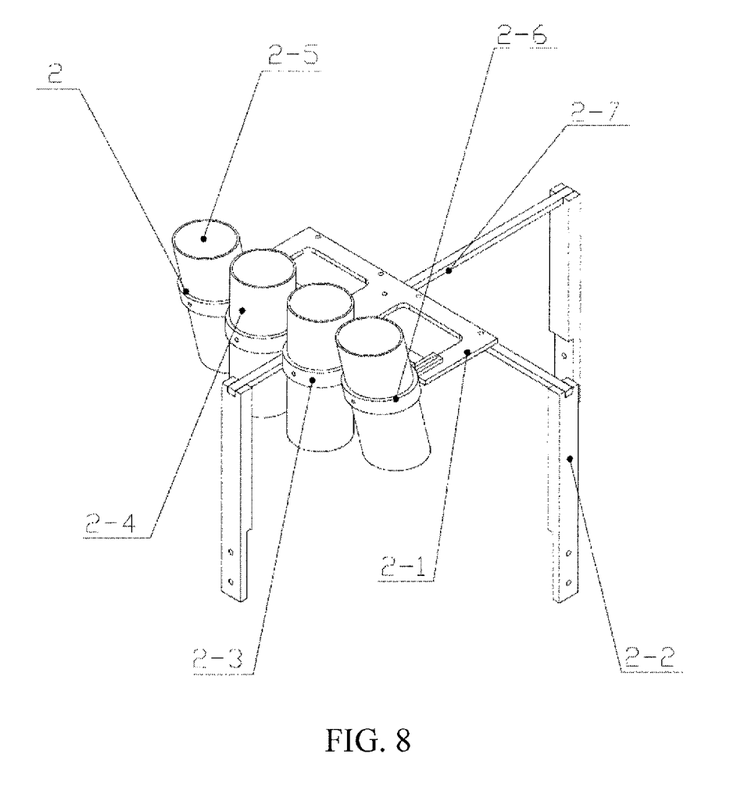
FIG. 8 is a schematic view of the seedling guiding device.

As shown in the FIG. 8, the guiding device 2 includes a mounting plate 2-1 for seedling guiding barrel, a vertical bracket 2-2, a clasp 2-3 for vertical seedling guiding barrel, vertical seedling guiding barrels 2-4, an inclined seedling guiding barrels 2-5, a clasp 2-6 for inclined seedling guiding barrel, a cross bracket 2-7, the vertical bracket 2-2 is mounted on the side of the seedling separating mechanism 4, and the cross bracket 2-7 is mounted on the vertical bracket 2-2. The mounting plate 2-1 for seedling guiding barrel is mounted on the cross bracket 2-7. The clasp 2-3 for vertical seedling guiding barrel and clasp 2-6 for inclined seedling guiding barrel are respectively mounted on the mounting plate 2-1 for seedling guiding barrel. The vertical seedling guiding barrels 2-4 and inclined seedling guiding barrels 2-5 are respectively coaxially mounted on the clasp 2-3 for vertical seedling guiding barrel and the clasp 2-6 for inclined seedling guiding barrel.

Figure 9A:
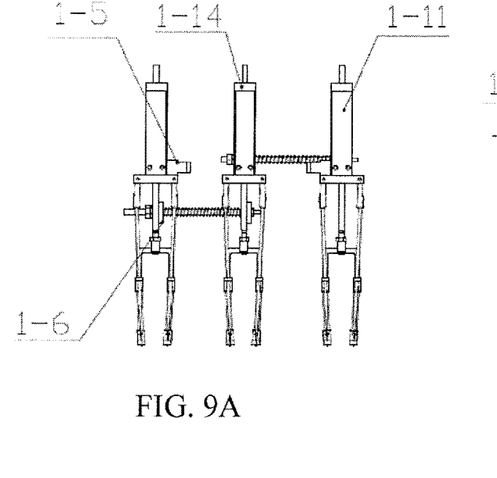
Figure 9B:
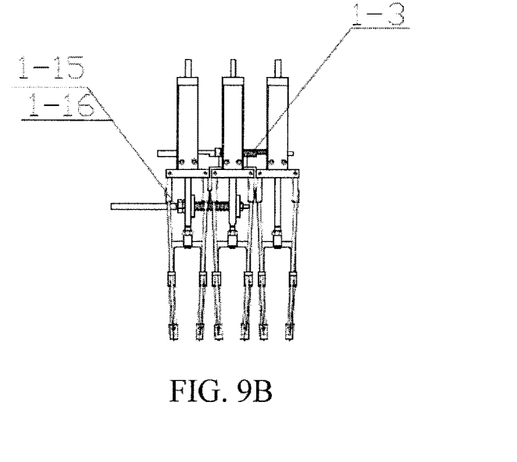

As shown in the FIG. 9, the picking seedling claws 1-11 are provided with spacers 1-5 for picking seedling claws, for separating each picking seedling claw 1-11, and when the horizontal moving cylinders 1-26 is fully contracted, the distance of picking seedling claws 1-11 is the same as the distance of holes of the disc 1-23. The minimum compression amount of the spring 1-3 is defined by the limit nut 1-16. When the horizontal moving cylinders 1-26 is extended to the furthest end, the elastic force corresponding to the minimum compression of the spring 1-3 can open each picking seedling claw 1-11, and each picking seedling claw 1-11 is concentric with each of the seedling guiding barrels 2-4, 2-5.

The vertical moving cylinder 1-9 is extended to move downward on the vertical moving linear guide 1-1, so that the picking seedling claw 1-11 is inserted downward into the seedling pot, and clamps the seedling pot. The vertical moving cylinder 1-9 is contracted to move upward on the vertical moving linear guide 1-1, so that the picking claw 1-11 pull out of the seedling pot upward and make the bottom of the seedling pot higher than the upper surface of the disc 1-23.

Figure 10:
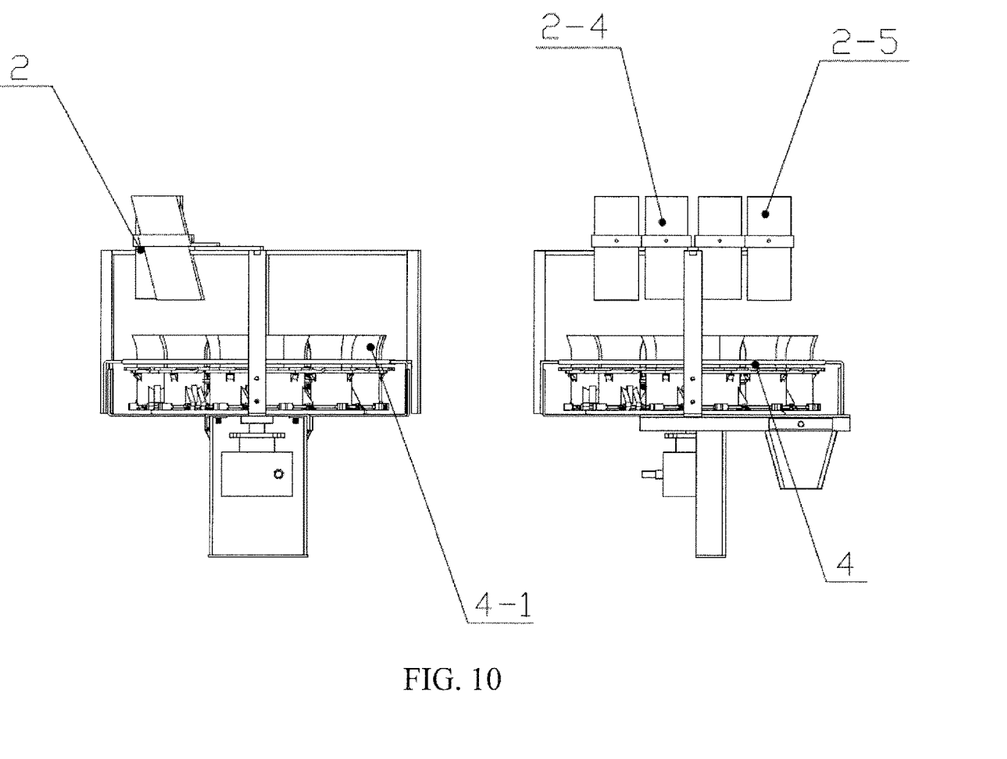
FIG. 10 is a view showing the position relationship between the seedling guiding barrels and the seedling guiding device.

As shown in FIG. 10, the centers of the upper surfaces of the vertical seedling guiding barrels 2-4 and the inclined seedling guiding barrels 2-5 are in the same line, and the centers of the lower surfaces is respectively concentric with the seedling separating cups 4-1.

As shown in FIG. 11, the method of the automatic picking and launching seedling device for transplanting machine includes the following steps.

Figure 11A:
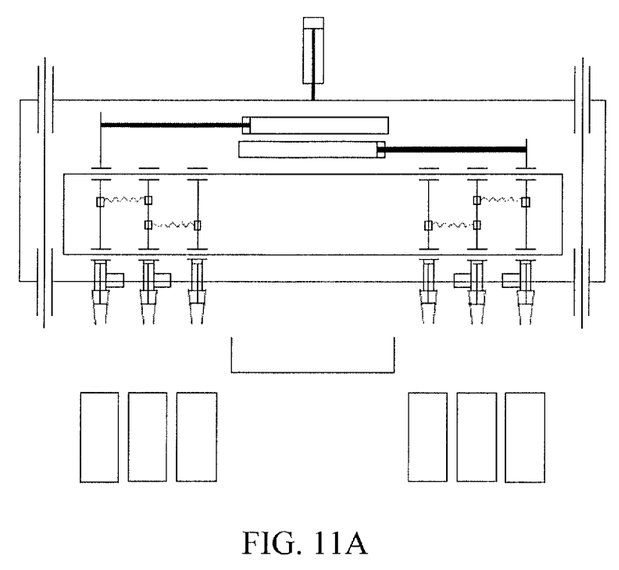

S1: the disc 1-23 is placed on the box shifting mechanism 3, and the horizontal moving cylinder 1-26 is extended to the farthest end at the same time. Each picking seedling claw 1-11 is located above the seedling guiding barrel 2-4.

Figure 11B:
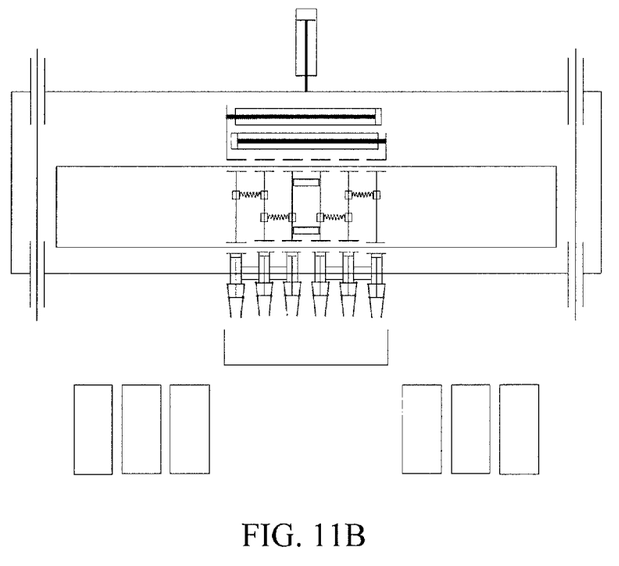

S2: the horizontal moving cylinder 1-26 is contracted, and the picking seedling claws 1-11 are driven to the center on the horizontal moving linear guide 1-13 by the moving driving board 1-17 for picking seedling claws. When the innermost picking seedling claw 1-11 is contracted with the stop bolts 1-7, the horizontal moving cylinders 1-26 continue to contract and compress the springs 1-3 until the spacer 1-5 for picking seedling claws is against the picking seedling claw 1-11. At the same time, each of the picking seedling claws 1-11 is located above the disc 1-23 and the distance between them is the same as the distance between the holes of the discs 1-23. The picking seedling claws 1-11 are located at seedling picking point.

Figure 11C:
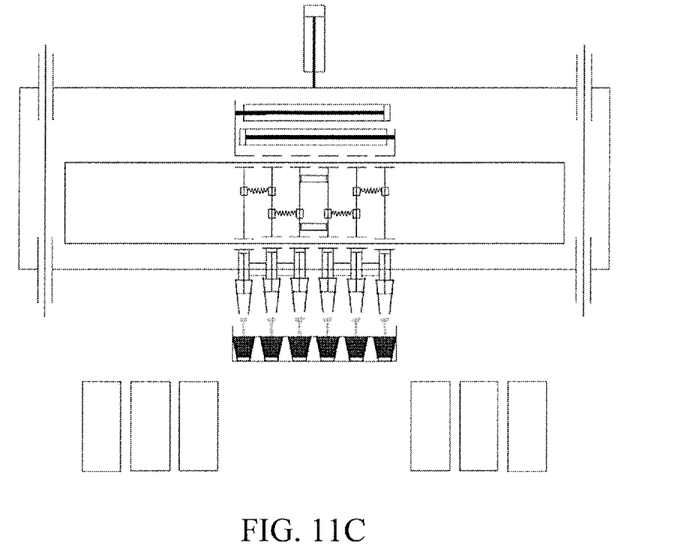

S3: the box shifting mechanism 3 transports the disc 1-23 to the seedling picking point.

Figure 11D:
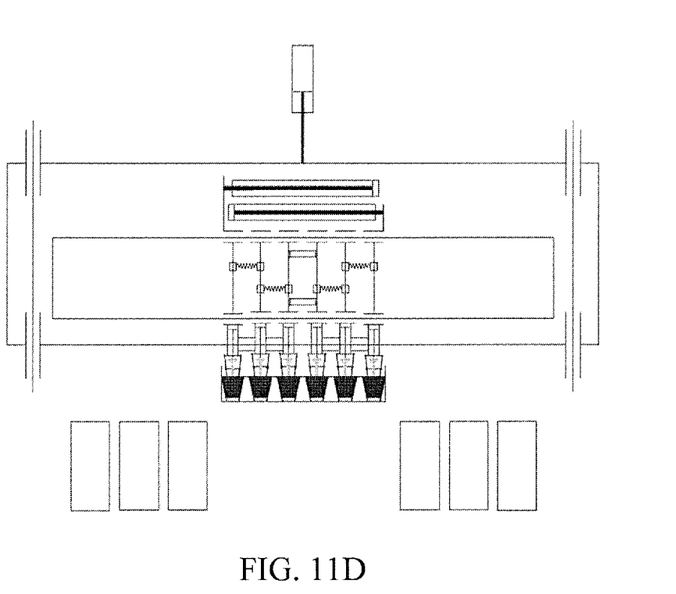

S4: the vertical moving cylinder 1-9 is extended, and the picking seedling claws 1-11 are moved downward on the vertical moving linear guide 1-1. The picking seedling claws 1-11 are inserted downward into the seedling pot and clamp the seedling pot at the same time.

Figure 11E:
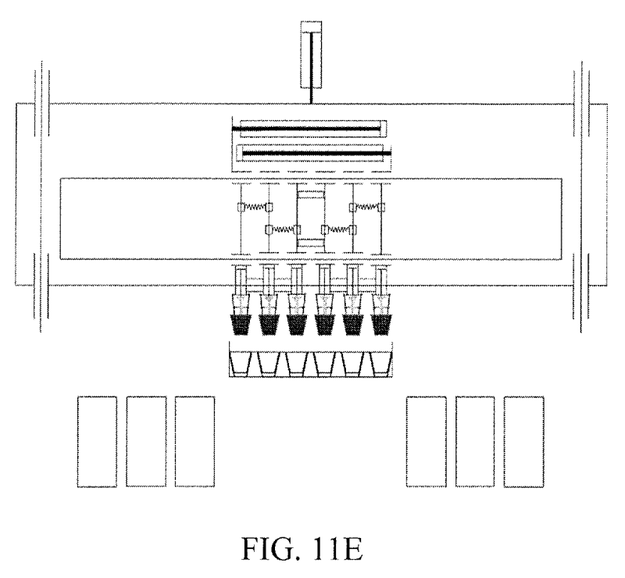

S5: the vertical moving cylinder 1-9 is contracted so that the picking seedling claws 1-11 are move upward on the vertical moving linear guide 1-1, so that the picking seedling claws 1-11 pull out of the seedlings pot upward to make the bottom of the seedling pot higher than the upper surface of the disc 1-23.

Figure 11F:
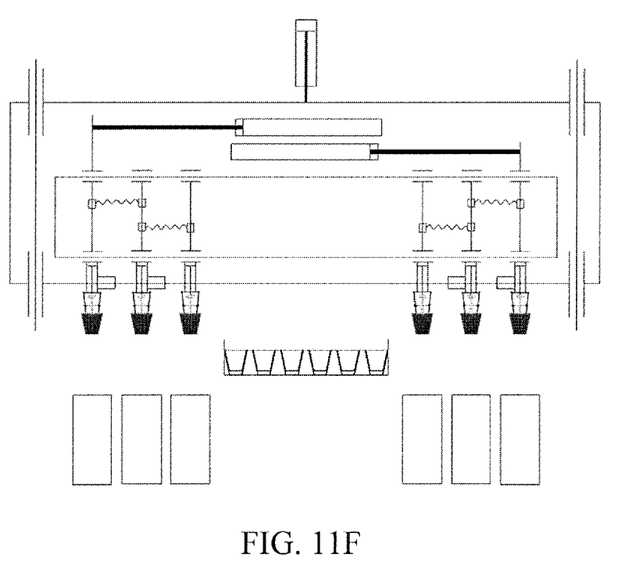

S6: the horizontal moving cylinder 1-26 is extended, and the picking seedling claws 1-11 are driven to the two sides on the horizontal moving linear guide 1-13 through the moving driving board 1-17 for picking seedling claws. The spring 1-3 is gradually opened, and pushes the spring plates 1-6 to the limit nut, so that the distance between each picking seedling claw 1-11 is spread to the same distance as the axis of each seedling guiding barrels 2-4, 2-5. When the horizontal moving cylinder 1-26 is extended and is contacted with the oil pressure buffer 1-18, each of the picking seedling claws 1-11 corresponds to each of the seedling guiding barrels 2-4, 2-5 and reaches the seedling launching point.

Figure 11G:
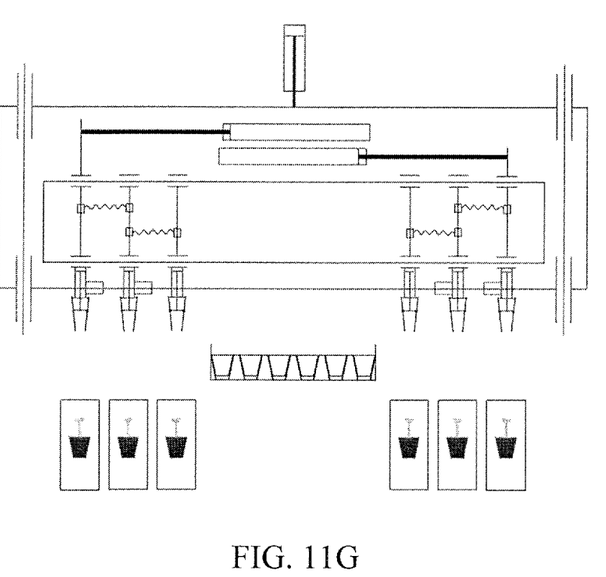

S7: the picking seedling claws 1-11 are opened and launch the seedling pot into the seedling guiding device 2. The seedling pot enters the seedling separating mechanism 4 along the seedling guiding barrels 2-4, 2-5, and the seedling separating mechanism 4 rotates the seedling pot to the seedling falling point.

S8: the horizontal moving cylinders 1-26 is contracted again to move the picking seedling claw 1-11 to the seedling picking point, the discs 1-23 advances the distance of a hole, and start the next picking and launching cycle until the whole disc of seedling pots is taken.

The examples are preferred embodiment of the present invention, but the present invention is not limited to the embodiments described above. Without departing from the essence of the present invention, any obvious modifications, substitutions or variations that can be made by the person skilled in the art are within the protection scope of the present invention.

The invention claimed is:

1. An automatic picking and launching seedling device for a transplanting machine, the device comprising:
   a seedling picking mechanism;
   two seedling guiding devices;
   a box shifting mechanism; and
   two sets of seedling separating mechanisms, each set of seedling separating mechanisms comprising seedling separating cups are arranged in a circular shape,
   wherein the seedling picking mechanism is installed on the box shifting mechanism,
   wherein the two sets of seedling separating mechanisms are symmetrically arranged on both sides of the box shifting mechanism,
   wherein the two seedling guiding devices are arranged over the two sets of seedling separating mechanisms, respectively,
   wherein the seedling picking mechanism comprises:
   a vertical moving linear guide;
   a rectangular frame;
   a spring;
   a vertical moving cylinder;
   a plurality of picking seedling claws;
   a bottom plate;
   a plurality of horizontal moving linear guides; and
   two horizontal moving cylinders,
   wherein the rectangular frame is fixed on a bracket, and a left side and a right side of the rectangular frame are mounted with the vertical moving linear guide, which is matched with a plurality of first sliders mounted on the bottom plate,
   wherein the vertical moving cylinder is mounted on an upper surface of the rectangular frame, and a piston rod of the vertical moving cylinder is connected to the bottom plate,
   wherein the bottom plate is provided on a front surface thereof with at least two parallel horizontal moving linear guides of the plurality of horizontal moving linear guides, and a plurality of second sliders is mounted on the bottom plate,
   wherein the two horizontal moving cylinders are mounted on a back surface of the bottom plate, and the bottom plate is provided with a plurality of parallel-arranged grooves, through which piston rods of the horizontal moving cylinders are connected to two moving driving boards for the plurality of pickling seedling claws on the front surface of the bottom plate,
   wherein the two moving driving boards for the plurality of pickling seedling claws are alternately mounted on a second slider of the plurality of second sliders on both ends of a horizontal moving linear guide of the plurality of horizontal moving linear guides,
   wherein a plurality of moving connecting plates for the plurality of pickling seedling claws is mounted on other second sliders of the plurality of second sliders through rail slider connecting blocks, and pickling seedling claws of the plurality of pickling seedling claws are respectively mounted on moving connecting plates of the plurality of moving connecting plates,
   wherein the two moving driving boards for the plurality of pickling seedling claws are respectively connected with a first outermost rail slider connecting block and a second outermost rail slider connecting block of the rail slider connecting blocks,
   wherein the spring is arranged between adjacent two picking seedling claws of the plurality of pickling seedling claws and is mounted on a screw and first and second ends of the screw are arranged with a limit nut,
   wherein, when a horizontal moving cylinder of the two horizontal moving cylinders is fully contracted, an innermost picking seedling claw of the plurality of picking seedling claws is concentric with an innermost hole of a disc, an outermost picking seedling claw of the plurality; of picking seedling claws is concentric with an outermost hole of the disc, and remaining seedling claws of the Plurality picking seedling claws are concentric with remaining holes in a same respective row on the disc, wherein, when a horizontal moving cylinder of the two horizontal moving cylinders is fully extended, a compression amount of the spring is at a minimum compression amount of the spring, defined by the limit nut, the outermost picking seedling claw is concentric with an upper opening of an outermost inclined seedling guiding barrel of a plurality of seedling guiding, barrels, and each remaining picking seedling claw is concentric with a respective remaining seedling guiding barrel of the plurality of seedling guiding barrels, wherein the seedling guiding device comprises:

a mounting plate for seedling guiding barrels, of the plurality of seedling guiding barrels, mounted on the bracket;

a first clasp for a vertical seedling guiding barrel, of the plurality of seedling guiding barrels; and a second clasp for an inclined seedling guiding barrel, the plurality of seedling guiding barrels, mounted on the mounting plate; and wherein the vertical seedling guiding barrel and the inclined seedling guiding barrel are respectively coaxially mounted on the first clasp and the second clasp, wherein seedling guiding outlets of the vertical seedling guiding barrel and the inclined seedling guiding barrel are respectively concentric with seedling separating cups within a set of seedling separating mechanisms of the two sets of seedling separating mechanisms.

2. The device according to claim 1, further comprising:

two oil pressure buffers mounted on the back surface of the bottom plate through oil pressure buffer mounting bases;

stop bolts mounted at a center of a front position of the bottom plate through stop bolt mounting bases, wherein, when a horizontal moving, cylinder of the two horizontal moving cylinders is fully contracted, the innermost picking seedling claws of the plurality of picking seedling claws is in contact with the stop bolts for limiting position, wherein a length of the stop bolts is such that the innermost picking seedling claw of the plurality of picking seedling claws is concentric with the innermost hole of the disc, and the outermost picking seedling claw of the plurality of picking seedling claws is concentric with the outermost hole of the disc, wherein, when a horizontal moving cylinder of the two horizontal moving cylinders is extended to bra farthest end and contacted with an oil pressure buffer of the two oil pressure buffers for limiting position, the outermost picking seedling claw of the plurality of picking seedling claws is concentric with the upper opening of the outermost inclined seedling guiding barrel of the plurality of seedling guiding barrels.

3. The device according to claim 1, wherein the plurality of horizontal moving linear guides comprises four horizontal moving linear guides arranged in parallel.

4. The device according to claim 1, wherein each picking seedling claw of the plurality of picking seedling claws comprises spacers, wherein, when a horizontal moving cylinder of the two horizontal moving cylinders is fully contracted, a distance between adjacent picking seedling claws of the plurality of picking seedling claws is the same as a distance between adjacent holes of the disc.

5. The device according to claim 1, further comprising spring plates that are respectively disposed at both ends of the spring, wherein the spring plates are also mounted on the screw.

6. The device according to claim 1, wherein a piston rod of the vertical moving cylinder is connected to the bottom plate by a first fisheye joint and a connecting plate for the vertical moving cylinder, and wherein a piston rod of each horizontal moving cylinder of the two horizontal moving cylinders is connected to the bottom plate by a respective second fisheye joint and a respective footstand.

7. The device according to claim 1, wherein each seedling guiding device of the two seedling guiding devices comprises exactly one inclined seedling guiding barrel, which is located at an innermost side of the respective seedling guiding device.

8. The device according to claim 1, wherein the bracket includes a vertical bracket and a cross bracket, wherein the vertical bracket is mounted on a side of a seedling separating mechanism of the two sets of seedling separating mechanisms, wherein the cross bracket is mounted on a top of the vertical bracket, and wherein the mounting plate is mounted on the cross bracket.

9. A picking and launching seedling method for the device according claim 1, wherein the method comprises the following steps:

S1: the disc is placed on the box shifting mechanism, and a first horizontal moving cylinder of the two horizontal moving cylinders is extended to a farthest end at the same time, wherein each picking seedling claw of the plurality of pickling seedling claws is located above the vertical seedling guiding barrel and the inclined seedling guiding barrel;

S2: the first horizontal moving cylinder is contracted, and each picking seedling claw of the plurality of picking seedling claws is driven to a center on a horizontal moving linear guide of the plurality of horizontal moving linear guides by a moving driving board of the two moving driving boards wherein, when the innermost picking seedling claw is contracted with stop bolts, the first horizontal moving cylinder continues to contract and compress the spring until a spacer for the respective picking seedling claw is against the respective picking seedling claw, wherein at the same time, each picking seedling claw of the plurality of picking seedling claws is located above the disc and a distance between them is the same as a distance between the holes of the disc, and the picking seedling claws of the plurality of picking seedling claws are located at a seedling picking point;

S3: the box shifting mechanism transports the disc to the seedling picking point;

S4: the vertical moving cylinder is extended, and the plurality of picking seedling claws is moved downward on the vertical moving linear guide through a driving of bottom plate, wherein the of picking seedling claws is inserted downward into a first seedling pot and clamps the first seedling pot at the same time, wherein the disc comprises a plurality of seedling pots including the first seedling pot;

S5: the vertical moving cylinder is contracted so that the plurality of picking seedling claws is moved upward on the vertical moving linear guide, to pull out the first seedling pot upward by the plurality of picking seedling claws and make a bottom of the first seedling pot higher than an upper surface of the disc;

S6: the first horizontal moving cylinder is extended, and the plurality of picking seedling claws is driven to two sides on a horizontal moving linear guide of the plurality of horizontal moving linear guides through a moving driving board of the two moving driving boards, wherein the spring is gradually opened and pushes spring plates to the limit nut, so that a distance between adjacent picking seedling claws of the plurality picking seedling claws is spread to be the same as a distance of an axis of each seedling guiding barrel of the plurality of seedling guiding barrels, wherein when the first horizontal moving cylinder is extended and contacted with an oil pressure buffer, each picking seedling claw of the plurality of picking seedling claws corresponds to each seedling guiding barrel of the plurality of seedling guiding barrels, respectively and reaches the seedling launching point;

S7: the picking seedling claws of the plurality of picking seedling claws are opened and launch the first seedling pot into a seedling guiding device of the two seedling guiding device, wherein the first seedling pot enters a seedling separating mechanism of the two sets of seedling separating mechanisms along a seedling guiding barrel of the plurality of seedling guiding barrels, and said seedling separating mechanism rotates the seedling pot to a seedling falling point; and S8: the first horizontal moving cylinder is contracted again to move picking seedling claws of the plurality of picking seedling claws to the seedling picking point, the disc advances a distance of a hole, and a next picking and launching cycle is started until all seedling pots of plurality of seedling pots of the disc are taken.

\* \* \* \* \*